Jan. 2, 1923.  1,440,907

P. BROWN ET AL.
WORM GEARING.
FILED OCT. 25, 1919.

Inventors,
Percy Brown, and
Francis J. Bostock
by Herbert W. T. Jenner.
Attorney.

Patented Jan. 2, 1923.

1,440,907

UNITED STATES PATENT OFFICE.

PERCY BROWN AND FRANCIS J. BOSTOCK, OF HUDDERSFIELD, ENGLAND, ASSIGNORS TO TIMKEN-DETROIT AXLE COMPANY, A CORPORATION OF OHIO.

WORM GEARING.

Application filed October 25, 1919. Serial No. 333,279.

*To all whom it may concern:*

Be it known that we, PERCY BROWN and FRANCIS JOHN BOSTOCK, subjects of King George V of Great Britain, residing at Huddersfield, in the county of York, England, have invented a new and useful Improvement in or Relating to Worm Gearing (for which we have applied for a patent in Great Britain No. 1,103, of 1915), of which the following is a specification.

This invention relating to worm gearing comprises an improved construction or formation of the thread of the worm or of the shape thereof and has for its object the removal or reduction of interference and the obtaining of a more perfect contact between the thread of the worm and the teeth of the worm wheel and increased load carrying capacity between the two gears. Our invention therefore consists in forming the thread of the worm with a surface such as would be generated by taking an oblique tangent to a cylinder and moving it along a helical line of contact at a constant angle taken to one hand on one surface of the thread and to the other hand on the opposite surface, as will hereafter be fully described with reference to the accompanying drawing in which:—

Figure 1:
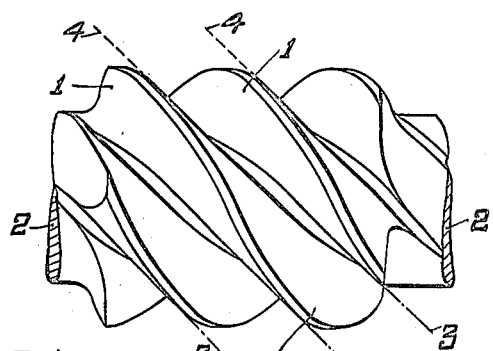
Fig. 1 is an elevation of a worm constructed according to and embodying our invention.
Figure 3:
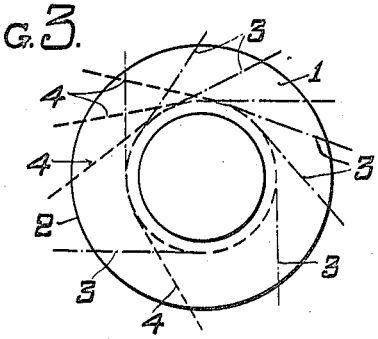
Fig. 3 is an end elevation of the worm.

Referring to the drawing, our invention consists in providing the thread 1 of the worm 2 with a surface every part of which contains a straight line passing from the root to the crest thereof and forming an oblique tangent to a cylinder along a helical line of contact at a constant angle, as indicated on each side of the worm thread by the dotted lines 3 and 4 in Figs. 1 and 3. The cylinder may be that of the worm at the base of the thread or may be of smaller or larger diameter.

Preferably the thread is provided with fillets adjacent to its inner or base portions.

Figure 2:
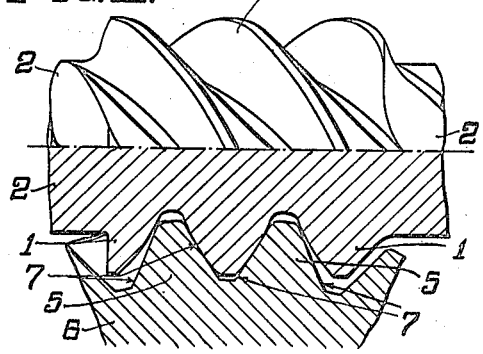
Fig. 2 is a similar elevation of the worm partly in section and of a fragment of a worm wheel in mesh therewith, the worm wheel being in section taken midway across the width of the teeth.

The teeth 5 of the worm wheel 6 at a point midway across the width of the teeth, are in cross section formed with substantially straight sides or surfaces 7 at the desired angles, as shown at Fig. 2, and the thread of the worm shaped as above set forth admits of a more perfect contact being obtained between the said thread of the worm and the teeth of the worm wheel because when such a tooth shape is in working contact with a wheel whose tooth sides are substantially straight in medial section, these two shapes very closely approximate each other and hence when a load is applied, the elasticity of the metal provides for a contact of greater area than is ordinarily obtainable and consequently gives an increased load carrying capacity between the two gears.

The thread of the worm and the teeth of the worm wheel may be cut in any of the ordinary machines now employed in the cutting of worms and worm wheels, a former cutter of the correct shape required being employed in the machine in place of the ordinary cutter.

Having thus described our invention, what we claim as new and desire to secure by Letters Patent is:—

1. As an improved article of manufacture, a worm adapted to revolve a worm wheel and having a thread formed or provided with a working surface every part of which contains a straight line extending from the root to the crest thereof in the direction of the lead and forming an oblique tangent to a cylinder concentric with the base or root of the worm thread along a helical line of contact at a constant angle.

2. The combination with a worm having its thread formed or provided with a surface every part of which contains a straight line from the root to the crest thereof and forming an oblique tangent to a cylinder, of a worm wheel whose teeth in medial section are formed with substantially straight sides or surfaces at the desired angle.

3. As an improved element of worm wheel gearing, a worm having a thread with a working surface every point of which contains a straight line from the root to the crest thereof forming an oblique tangent along a helical line of contact at an acute angle in the direction of the angle of lead to a cylinder having a diameter approximating that of the root of the worm thread.

4. As an improved element of worm wheel gearing a worm having a thread with its working face shaped to conform to the surface generated by moving a line forming an oblique tangent to a cylinder along a helical line of contact at an acute angle in the direction of the angle of lead taken to one hand on one surface of the thread and to the other hand on the opposite surface.

5. Worm gearing comprising a worm provided with a helical tooth having a working portion shaped to conform to the surface generated by a straight line rolled upon a cylinder coaxial with the worm, and a cooperating worm wheel whose teeth, in medial section, are formed with substantially straight sides conjugate to the working portion of said worm.

6. A worm wheel with teeth conjugate to a worm having a helicoidal working face composed of elements tangent to its base cylinder at an acute angle in the direction of the angle of lead.

7. In a worm gearing, a worm adapted to revolve a worm wheel, said worm having a helical thread the working face of which has the shape formed by revolving a straight line helically around the axis of the worm in the direction of its lead, said line extending in the direction of lead and being maintained tangent at a constant angle to a cylinder which is co-axial with the worm.

8. In a worm gearing, a worm adapted to revolve a worm wheel, said worm having a plurality of helical threads the working faces of which conform to the shape produced by revolving a straight line helically around the axis of the worm in the direction of the lead of the worm, said line extending in the direction of lead of the worm and being maintained tangent at a constant angle to a cylinder which is co-axial with the worm, and small fillets between the working faces of adjacent threads at their roots.

In testimony whereof we affix our signatures in the presence of two witnesses.

PERCY BROWN.
FRANCIS J. BOSTOCK.

Witnesses:
ERNEST MORELEY,
LEONARD GHIRBUR.